R. BRUSHWILER AND A. OTTO.
MACHINE FOR MOUNTING TIRES ON SEALING RINGS.
APPLICATION FILED FEB. 4, 1921.

1,431,366.

Patented Oct. 10, 1922.
4 SHEETS—SHEET 1.

INVENTORS.
Robert Brushwiler and
Albert Otto,
BY
Ernest Hopkinson
THEIR ATTORNEY.

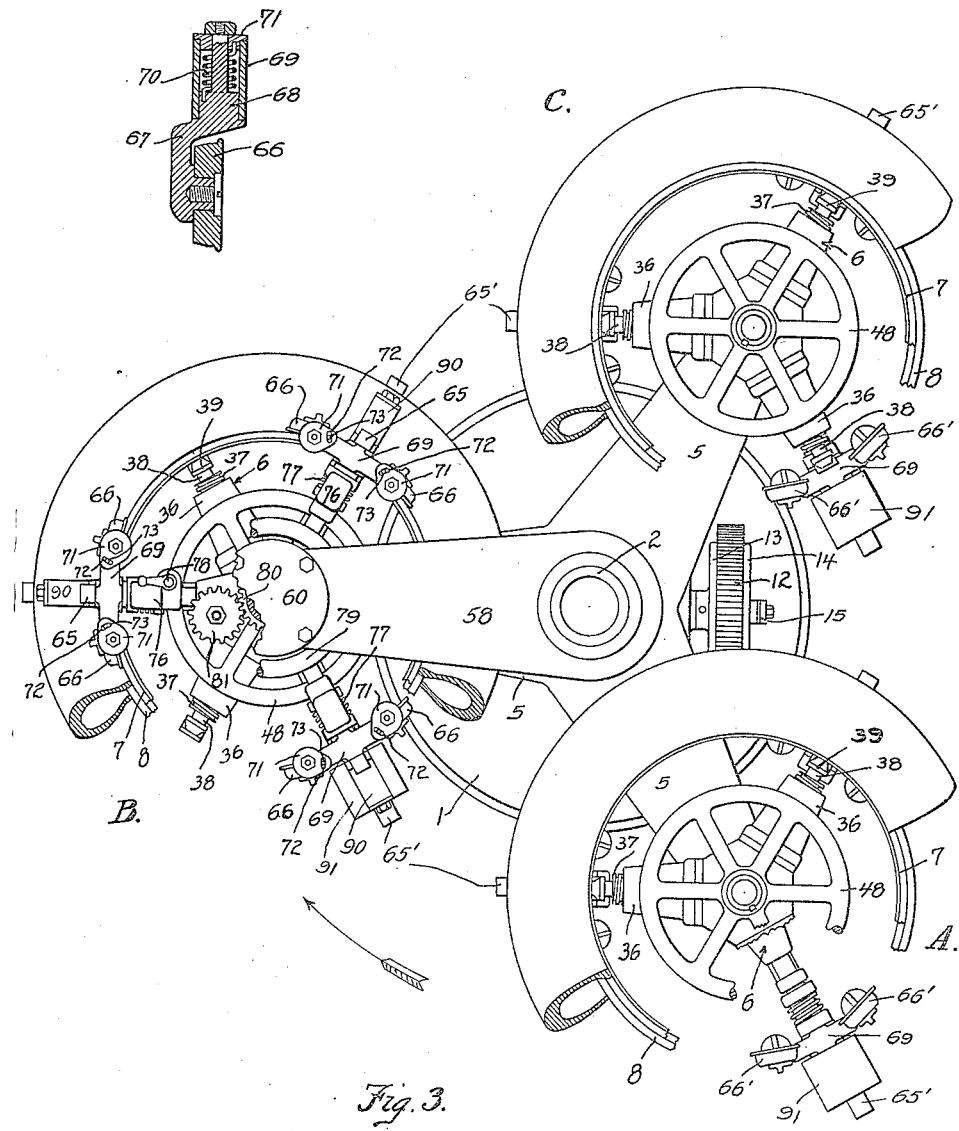

R. BRUSHWILER AND A. OTTO.
MACHINE FOR MOUNTING TIRES ON SEALING RINGS.
APPLICATION FILED FEB. 4, 1921.

Patented Oct. 10, 1922.

INVENTORS.
Robert Brushwiler and
Albert Otto,
BY
Ernest Hopkinson
THEIR ATTORNEY.

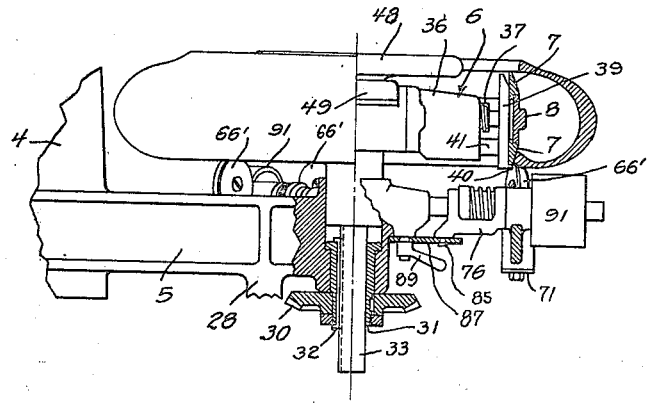
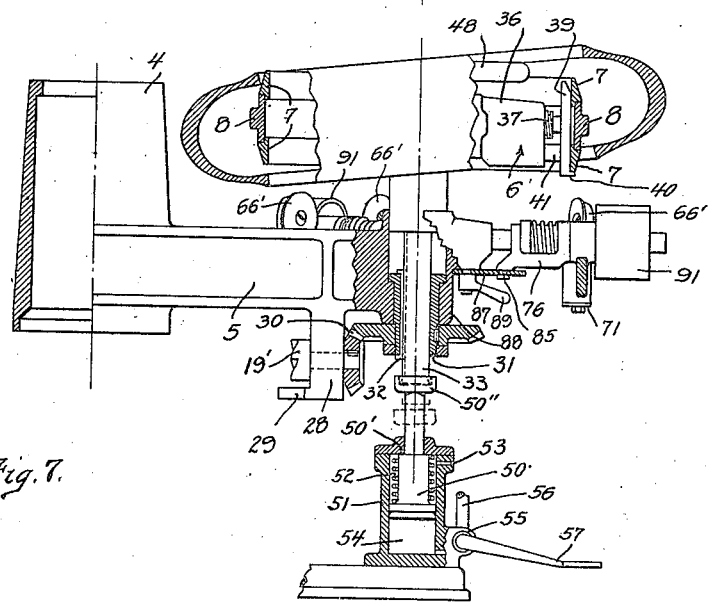

Patented Oct. 10, 1922.

1,431,366

UNITED STATES PATENT OFFICE.

ROBERT BRUSHWILER AND ALBERT OTTO, OF DETROIT, MICHIGAN, ASSIGNORS TO MORGAN & WRIGHT, A CORPORATION OF MICHIGAN.

MACHINE FOR MOUNTING TIRES ON SEALING RINGS.

Application filed February 4, 1921. Serial No. 442,374.

*To all whom it may concern:*

Be it known that we, ROBERT BRUSHWILER and ALBERT OTTO, both citizens of the United States, and residents of Detroit, county of Wayne, State of Michigan, and Detroit, county of Wayne, State of Michigan, respectively, have invented new and useful Improvements in Machines for Mounting Tires on Sealing Rings, of which the following is a full, clear, and exact description.

This invention relates to the manufacture of tires, and more particularly to apparatus for assembling tires on sealing rings preliminary to their cure.

In one method of curing pneumatic tires internally under fluid pressure during the heat, the bottom of the mold cavity is closed by a sealing ring on which the tire has been mounted by distension of its beads, the latter being normally (when built and before cure) of less diameter than the seats on the sealing ring. Heretofore the beads of the carcass have been mounted on the sealing ring by a laborious method. After introducing the sealing ring within the carcass by spreading its beads, rings with inclined surfaces were seated on the sides of the sealing ring and two operatives progressively hammered away at the beads to shift them up the inclined surfaces of the side rings onto the sealing ring, first one side being mounted and then the other. This old practice was objectionable. The operatives whacked their hands and injured the carcass. Also, the operation was slow and expensive.

The present invention aims to provide a machine that will enable tires to be mounted on sealing rings expeditiously, cheaply, and without intolerable injury to their beads.

With the construction illustrated in the drawings in mind, and without intention to limit the scope of the invention more than is required by the prior art, it may be said to consist in a series of chucks for holding sealing rings with wedge rings on both sides thereof up the inclined surfaces of which the beads of a tire may be forced by shifting rollers while one of the chucks is rotated in cooperative relation therewith. Three separate chucks are provided, and while the beads of a tire are being mounted on a sealing ring supported by one chuck, an operative at a second chuck is initially assembling sealing and wedge rings on a chuck and placing a tire loosely about the same, and another operative at a third chuck is removing therefrom a tire that has been mounted on a sealing ring.

The preferred embodiment of the invention is illustrated in the accompanying drawings, in which—

Fig. 3 is a plan view of the apparatus.

Fig. 4 is a detail in vertical section of one of the bead shifting rollers showing a swiveled support therefor.

Fig. 7 shows a chuck after it has been shifted axially or lifted to facilitate enclosing a tire about the assembled sealing and side rings, and Fig. 8 illustrates the position assumed by the tire after the chuck has been lowered upon the bottom set of bead shifting rollers, but before seating of the tire beads on the sealing ring.

Figures 1, 2:
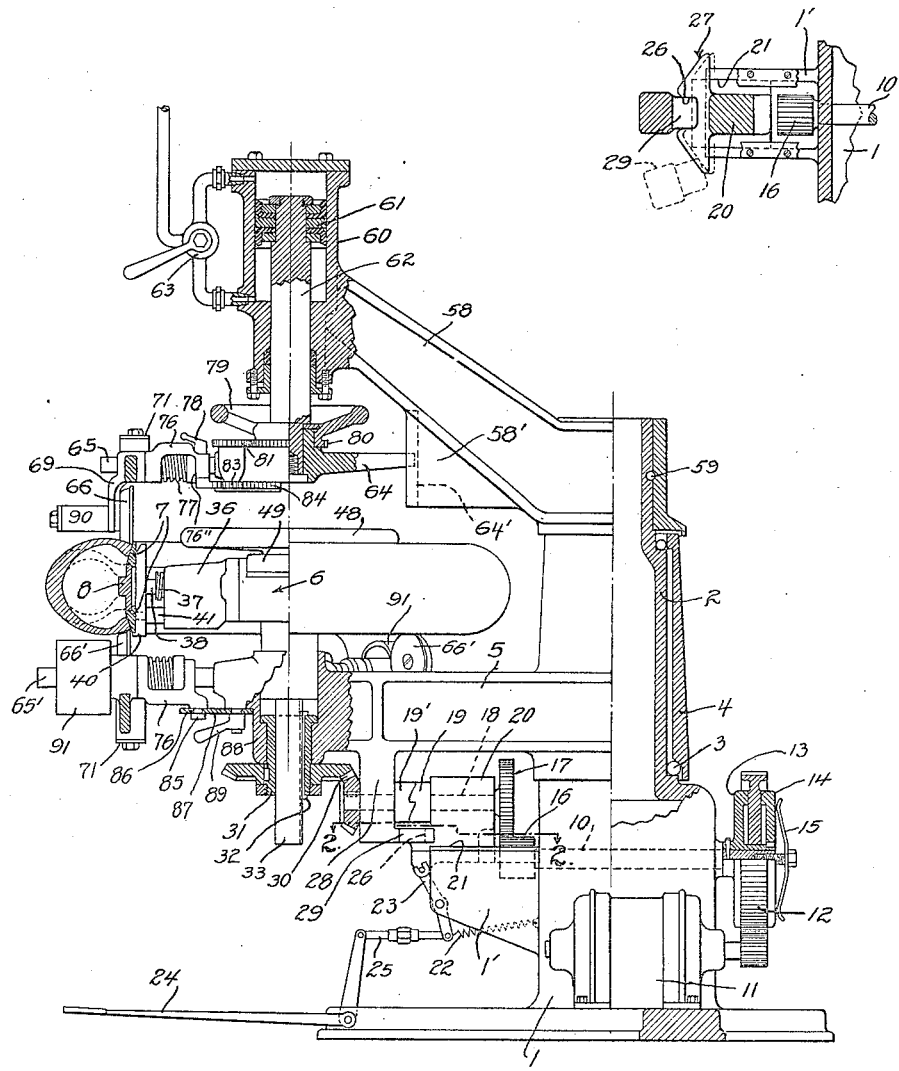
Fig. 1 is a side elevation of the apparatus with only one of three arms of a swivel frame shown, parts being broken away and sectioned to better illustrate the construction.
Fig. 2 is a section on the line 2—2, Fig. 1 showing in detail a latching mechanism for holding one of the chucks in cooperative relation with bead shifting mechanism.

Referring more particularly to Figs. 1 and 3, from the base or pedestal 1 rises a column or post 2 to which is swiveled as indicated at 3 the tubular portion of a frame 4 having a plurality of arms 5, preferably three, each of which carries a chuck indicated generally by the numeral 6. The chucks 6 are of identically the same construction, and each is adapted to support bead expanding rings 7 on opposite sides of a sealing ring 8, the inwardly, upwardly and convergent inclined surfaces of the rings 7 terminating contiguous and substantially flush with the bead seats on the sealing rings 8.

In order to mount the beads of a tire on the sealing ring throughout its circumfertary movement between the tire and the bead shifting mechanism. While either might be rotated, it is preferred to rotate the tire, and for this purpose each of the chucks 6 is adapted to be rotated, when in cooperative relation with bead shifting mechanism, by the main shaft 10, Fig. 1, journaled in the stationary base 1. This main shaft may be operated in any suitable manner as by a belt (not shown) or by a motor indicated at 11. The armature of the motor may be geared as illustrated to the intermediate and slidable member 12 of a friction clutch whose flanking discs 13 and 14 are pinned and feathered respectively to the shaft 10, power of the drive or torque of shaft 10 being no greater than the friction imposed by an adjustable spring 15 urging the several discs together. On the opposite end of the shaft 10 is a broad faced pinion 16 in mesh with a gear 17 on a shaft 18 carrying one part 19 of a clutch and journaled in a bearing 20 that is slidably mounted in ways 21, see Fig. 2, in the projecting portion 1' of the base. Normally the clutch part 19 is held coupled to a clutch part 19' by a spring 22 which operates a lever 23 connected to the bearing 20. A foot lever 24 and link 25 afford means for overcoming the spring 22 and disengaging the clutch parts.

The bearing 20, see Fig. 2, has a vertically extending notch 26 flanked by inclined surfaces 27 and each arm 5 of the swiveled frame 4 has a depending integral lug 28 with a tongue 29 that is adapted to enter the notch 26 and thus hold the frame against rotation, and in a position such that the chuck it carries is in aligned cooperative relation with an upper set of bead shifting rollers. The clutch part 19' is connected through bevel gearing 30 to a sleeve 31 supported by an arm 5 and feather-keyed as indicated at 32 to a spindle 33 that carries a chuck. With the tongue 29 of any one of the arms 5 seated in the notch 26 and the clutch parts 19—19' engaged, the chuck carrying shaft 33 that is borne by that particular arm may be rotated from the main shaft 10.

Figures 5, 6:
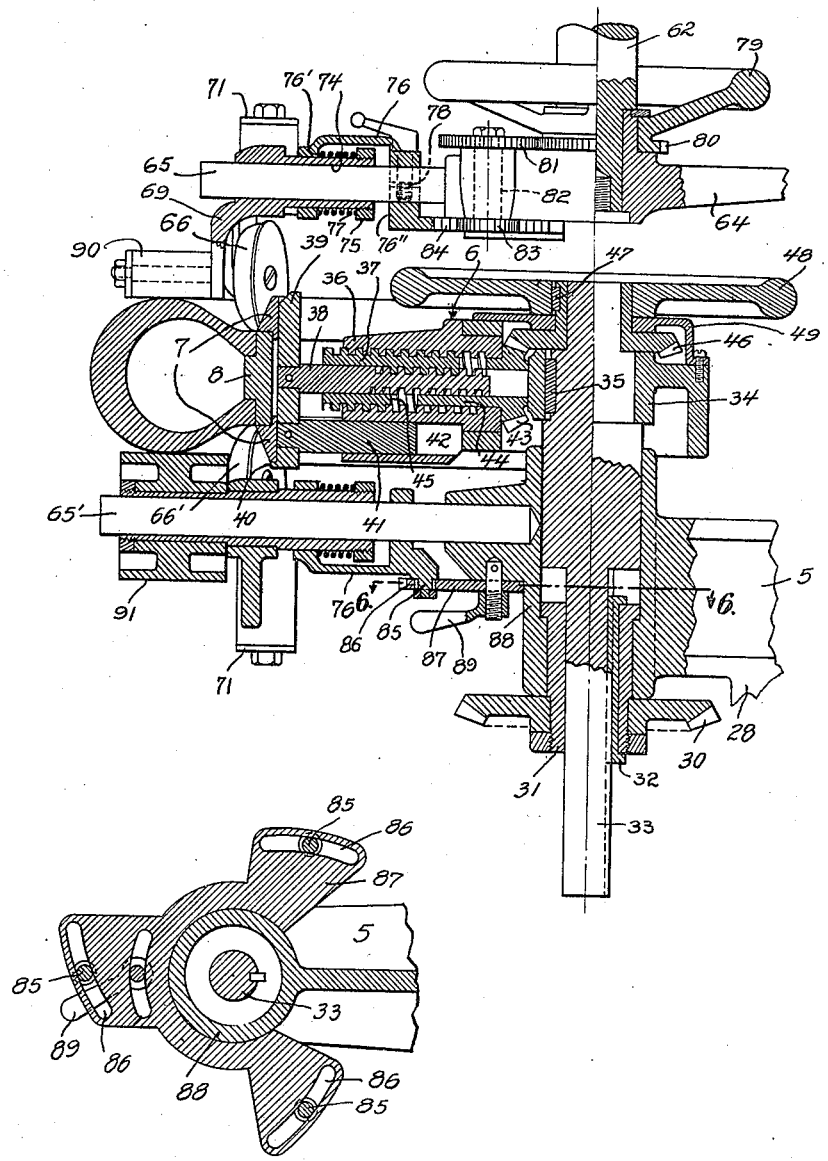
Fig. 5 shows in vertical section, and partly in quarter section, details of a chuck and of bead shifting rollers at substantially the completion of a mounting operation.
Fig. 6 is a section on the line 6—6, Fig. 5, showing details of an adjustment for the lower set of bead shifting rollers.

Referring to Fig. 5, each chuck 6 is shown to consist of a casting or spider having a hub 34 keyed as indicated at 35 to the upper enlarged end of the shaft 33. From the hub portion 34 radiate spokes 36, preferably three, but more if desired, each of which is threaded to receive a tubular member or sleeve 37 that is provided both externally and internally with threads, the latter of which cooperate with the threaded ends of an arm 38. Arm 38 of each chuck at its outer free end carries a jaw or plate 39 having a flange 40 and an inwardly extending pin 41, which latter is adapted to enter a socket 42 provided in the relatively fixed spoke 36. In axial alignment with the threaded sleeve 37, and adjacent the spindle 33, is a bevel gear 43 which is also journaled in the spoke 36 and has a finger 44 that is adapted to enter a slot cut lengthwise through the threads on the sleeve 37 to an extent indicated by the numeral 45. Bevel gear 43 is in mesh with bevel gear 46 that is journaled on the chuck spindle 33 and has keyed to it as indicated at 47 a hand wheel 48. Covering the bevel gear 46 and between the same and the hand wheel 48 is a housing 49 that prevents entrance of dust and dirt and the operator from chance mutilation of his fingers.

As the external and internal threads on the sleeve 37 are oppositely inclined (that is, one is right handed and the other is left handed) and as the stem 38 is prevented from rotating by the finger 41 that is socketed in the relatively fixed spoke 36, rotation of the hand wheel 48 will result in rapidly advancing or retracting the arms 38 of each of the three chuck spokes whose bevel gears 43 are all in mesh with the hand wheel gear 46 and consequently enable the jaws 39 to grip bead expanding rings 7 and a sealing ring 8 that have been previously positioned loosely thereabouts.

Straight sided tires with inextensible beads are difficult to assemble even loosely, so as to enclose the sealing ring with its flanking wedge rings. To facilitate the loose enclosure of the several rings by the tire or carcass, it has been found desirable to lift the chuck clear of its frame arm 5 where access to both sides of the ring is free and unobstructed, as shown in Fig. 7. While this may be accomplished in various ways, it is preferred to locate in axial alignment with one of the chuck spindles 33 (when the frame 4 is held by the latching mechanism illustrated in Fig. 2) a plunger 50 having a cupped extremity 50''. On the rear of the piston 50 operates a coil spring 52 and this end of the cylinder is vented into the atmosphere as indicated at 53. To the space indicated by the numeral 54 of the front side at the piston, fluid, such as air or water under pressure, may be admitted through any suitable type of valve indicated at 55, which is normally held closed by a spring (not shown) so as to cut off the supply from a line 56, the valve being operable by a foot treadle indicated at 57. Normally the coil spring 52 holds the plunger 50 down, and when it is desired to raise the chuck that has been previously located by the latching mechanism, the operator depresses treadle 57 to open the valve 55 and apply fluid pressure to the lower end of piston 50 which rises until the shoulder 50' encounters the upper bead of the cylinder 51. The parts are then in the position shown in Fig. 7, and by spreading the beads of the tire and canting it, the same may be loosely positioned about the nested sealing and wedge rings. When this has been done, the treadle 57 is released to cut off the supply of fluid under pressure and exhaust the space 54, whereupon the spring 52 acts in conjunction with gravity to return the piston 50 and the chuck to the position shown in Fig. 8.

After the tire has been spread and inclosed about sealing and wedge rings held clamped by a chuck, it is moved around through an arc of 120° to bring it beneath and in aligned cooperative relation with an upper set of bead shifting rollers, a lower set thereof being mounted on each of the three frame-arms 5. The upper set of bead shifting rollers is carried by a head 58, Fig. 1, that is preferably taper-pinned as indicated at 59 on the upper end of the post 2, but may, if desired, be made adjustable to bring it into vertical alignment with any one of the frame-arms 5, whose position is of course determined by the latching or indexing mechanism illustrated in Fig. 2. The head 58 at its outer free end carries a cylinder 60, in which reciprocates a piston 61 having a depending piston rod 62 that carries the upper set of bead shifting rollers and is in axial alignment with a chuck spindle 33, being at the same distance from the axis of the post 2. The piston rod 62 may be moved axially by fluid pressure applied to the sides of its piston 61 and controlled by any suitable type of valve as indicated at 63. The lower end of the piston rod 62 has fixed to it a laterally extending arm 64 which is adapted to move up and down vertically in a slot 64′ formed in the vertical face of a lug 58′ integral with the head 58 and by this means, rotation of the piston rod 62 is prevented without interfering with its reciprocation.

Fixed at about 120° from each other to the lower end of the piston rod 62, are three substantially horizontal pins or rods 65, each of which is adapted to carry a pair of bead shifting rollers 66. Each roller 66 is of the construction illustrated in cross section in Fig. 4, and is rotatably secured to the angular-form post 67, whose upper 68 is swiveled in the bore of a yoke 69. A torsion spring 70 has its opposite extremities anchored in the end 68 of the post and in a cap 71, the latter being free to turn to an extent limited by its arcuate slot 72, which embraces a pin 73, Fig. 3, integral with the yoke 69. Thus each roller 66 may swivel about a vertical axis to a limited extent against the action of a torsion spring.

There are two rollers 66 borne by each yoke 69, one only of whose tubular portions appears in Fig. 4. Intermediate the pair of rollers 66 the yoke 69 in its upper portion is provided with a tubular projection 74, see Fig. 5, that fulcrums or swivels on a rod 65. Between a nut 75 and the abutment face 76′ of a member 76 is interposed a coil spring 77. The member 76 is adjustably clamped by a species of split collar and thumb bolt as indicated at 78 to the rod 65. The members 76 may be shifted and the position of the three pairs of rollers 66 varied by turning a hand wheel 79 whose hub is machined to form a gear 80 in mesh with a pinion 81 on shaft 82 that is journaled in a part fixed to the piston rod 62 and carries at its lower end a second pinion 83 in mesh with a rack 84 integral with the member 76. The action of the spring 77 being limited by a second abutment face 76″ on the member 76, the adjustment just described would permit of locating the three pairs of rollers 66, that are yieldingly swiveled to the arms 76, further or nearer the axis of the chuck spindle 33. Their swiveled mounting both about a vertical axis 68, and about a horizontal axis 65, will permit each pair of rollers 66 to equalize its operation on a bead, as the same is forced up the inclined surfaces of the side rings by the admission of pressure to the proper side of the piston 61.

The rollers 66′ of the lower set are supported in pairs spaced similarly and in opposition to rollers of the upper set and swiveled in substantially the same manner with the exception that their abutment members 76 are adapted to be simultaneously adjusted in radial directions by pins 85 integral with the members 76 which enter cam slots 86 in a plate 87 that is adjustably secured to the exterior of a boss 88 which is integral with a frame arm 5, a hand clamp 89 being provided to clamp the plate 87 in any adjusted position.

On the yokes 69 anti-friction rollers 90 are supported for rotation about a substantially horizontal axis and similar rollers 91 are supported by the rods 65′ of the lower set of bead shifting rollers, these opposed rollers 90—91 being designed to maintain the tire in symmetrical relation to the sealing ring during the progress of a bead shifting operation.

The preferred operation of the machine is as follows:—

An operator at station A, Fig. 3, through the hand wheel 48 sets the chuck jaws 39 so as to loosely receive and sustain the lower of the two wedge rings 7. The sealing ring 8 is then laid on and nested with the lower wedge ring 7, after which the upper wedge ring 7 is positioned on the sealing ring. Then the hand wheel 48 is again operated to tightly clamp the assembled rings. Through the foot operable valve 55, the plunger 50 is then actuated to raise the chuck to the clear and unobstructed position shown in Fig. 7, in which by spreading the beads the operative may with comparative ease encircle the tire about the rings with its beads loosely seated thereon at the lower margins of their inclined faces. The chuck is then lowered to the position shown in Fig. 8. This completes the preliminary assembling operation.

The treadle 24 is then depressed to disengage the tongue 29 from the notch 26 and also the clutch parts 19—19', when the frame 4 may be turned about its swiveled connection with the post 2 to bring the arm 5 that has had its chuck preliminarily loaded as just described into coaxial relation with the piston rod 62, which axial relation is reached when the tongue 29 of that particular arm snaps into the notch 26 as indicated in Fig. 2. The operator at the mounting station B, then manipulates the valve 63 to bring the upper set of bead rollers against the tire beads. The flanges of the three pairs of upper rollers 66 first come in contact with the upper bead of the tire and, swiveling about their vertical axes, set themselves in a position so that their axes of rotation are substantially radial to the chuck and consequently also the tire. The flanges of the rollers 66 in their further downward movement engage over the heel of the bead and force the upper bead of the tire down upon the conical face of the upper wedge ring until the bead finally seats on the sealing ring. The downward pressure of the upper set of rollers causes the chuck to move downwardly on its feathered drive connection 32, and compels the lower set of rollers to simultaneously press the lower bead of the tire upward onto the sealing ring. During this operation the flanges of the rollers 66 and 66' contact with the conical faces of the wedge rings, and are shifted radially outward against the tension of their springs 77, the latter insuring engagement under the heels of the beads. As the chuck is rotated and while the upper set of bead rollers is advanced toward the lower set, the beads are progressively shifted to their seats on the sealing ring throughout the circumference of the latter, and without harmful injury.

The mounted tire is then swung out of the way to the third station indicated by the letter C, Fig. 3, where the upper wedge ring may be removed and the mounted tire likewise.

The foregoing relates to the preferred construction and its usage. It will be obvious that the frame which carries the chucks may be fixed against movement and the upper set of bead rollers together with the main shaft and the chuck spindle shifting cylinder moved relative to the frame, such an organization being a mere reversal of the preferred construction. Also it will be obvious that both sets of bead shifting rollers may be mounted for movement edgewise or that the lower set alone may be moved edgewise. Still further, the number of chucks and the number of bead shifting rollers may be increased or decreased as desired. And it would be within the broad principles of the invention to position the chuck supporting frame for movement in a vertical plane, but this we do not deem as desirable as the preferred construction illustrated in the drawings. These and other changes might be made in the details and in the arrangement of parts without departure from the underlying principles of the invention, and reference should therefore be had to the appended claims for a full understanding of its scope.

Having thus described our invention, what we claim and desire to protect by Letters Patent is:

1. Apparatus for mounting tires on sealing rings including in combination, bead shifting mechanism including upper and lower rollers, a plurality of chucks, means supporting said chucks permitting bodily movement therof to position any one of them in aligning cooperative relation with one of said rollers, bead expanding devices sustained by the chucks, and means for producing a relative rotary movement between a chuck and the bead shifting rollers when in aligned cooperative relation whereby to effect a circumferential distension and seating of the beads of a tire on a sealing ring supported by one chuck while tires and sealing rings are being assembled on and removed from the other chucks.

2. Apparatus for mounting tires on sealing rings including in combination, bead shifting mechanism including upper and lower rollers, a plurality of chucks, a rotatable frame for supporting said chucks in spaced relation and permitting each of them to be successively positioned in cooperative relation with the upper of said rollers, bead expanding devices sustained by said chucks, and means for producing a relative rotary movement between a chuck and the bead shifting rollers when in cooperative relation whereby to effect a circumferential distension and seating of the beads of a tire on a sealing ring supported by one chuck while tires and sealing rings are being assembled on and removed from the other chucks.

3. Apparatus for mounting tires on sealing rings including in combination, bead shifting mechanism including upper and lower rollers, a plurality of chucks, means supporting said chucks permitting bodily movement thereof to position any one of them in aligning cooperative relation with one of said rollers, bead expanding devices sustained by the chucks, and means for rotating a chuck while in cooperative aligned relation with the bead shifting rollers whereby to effect a circumferential distension and seating of the beads of a tire on a sealing ring supported by one chuck while tires and sealing rings are being assembled on and removed from the other chucks.

4. Apparatus for mounting tires on sealing rings including in combination, bead shifting mechanism including upper and lower rollers, a plurality of chucks, a rotatable frame for supporting said chucks in spaced relation and permitting each of them successively to be positioned in cooperative relation with one of the bead shifting rollers, bead expanding devices sustained by said chucks, and means for rotating a chuck while in cooperative relation with the bead shifting rollers whereby to effect a circumferential distension and seating of the beads of a tire on a sealing ring supported by one chuck while tires and sealing rings are being assembled on and removed from the other chucks.

5. Apparatus for mounting tires on sealing rings including in combination, bead shifting mechanism including a plurality of rollers disposed symmetrically about a vertical axis, means for bodily shifting the rollers edgewise in parallelism with said axis, a plurality of chucks, means for supporting said chucks in spaced relation and permitting bodily movement thereof to position any one of them in coaxial relation with the vertical axes of the rollers, means for rotating a chuck in such coaxial relation, and bead expanding devices sustained by said chuck.

6. Apparatus for mounting tires on sealing rings including in combination, bead shifting mechanism, a plurality of chucks, bead expanding devices sustained by said chucks, a movable frame rotatably supporting each chuck, a driven main shaft revoluble about a fixed axis, actuating trains of mechanisms carried by said frame for rotating each chuck and adapted individually to be engaged and disengaged from driving relation with said main shaft and by movement of the frame in locating one of the chucks in cooperative relation with the bead shifting mechanism.

7. In an apparatus for mounting tires on sealing rings, a chuck, a shaft for supporting said chuck, connections for actuating said shaft, and means for shifting said shaft axially independently of its driving connections to facilitate the initial placing of sealing and wedge rings and tires thereon.

8. In an apparatus for mounting tires on sealing rings, in combination, bead shifting mechanism including rollers adapted to engage opposite beads of a tire, means for bringing the rollers together, a chuck adapted to support a tire loosely enclosing a sealing ring and with its beads in the path of said rollers, and driving connections for said chuck including an axially movable shaft permitting the chuck to shift to equalize the action of the rollers in engaging opposite beads.

9. In an apparatus for mounting tires on sealing rings, a vertically arranged shaft, a chuck supported in a substantially horizontal plane by said shaft and having a plurality of stems, ring holding jaws at the ends of said stems having flanges on their lower margins for supporting sealing and wedge rings, and means for rotating the shaft.

10. In an apparatus for mounting tires on sealing rings, a chuck adapted to support a sealing ring, means sustained by the chuck at the sides of the sealing ring for expanding the beads of a tire, bead shifting mechanism including rollers each swiveled for movement about a vertical axis, and means for producing relative rotation between the chuck and the bead shifting mechanism whereby to effect a circumferential seating of tire beads on a sealing ring.

11. In an apparatus for mounting tires on sealing rings, a chuck adapted to support a sealing ring, means sustained by the chuck for expanding the beads of a tire, bead shifting mechanism including rollers yieldingly urged radially inward of the chuck, and means for producing relative rotation of the chuck and the bead shifting mechanism whereby to effect a circumferential seating of tire beads on a sealing ring.

12. In an apparatus for mounting tires on sealing rings, a chuck adapted to support a sealing ring, means sustained by the chuck for expanding the beads of a tire, bead shifting mechanism including rollers and swiveled supports therefor spring pressed inwardly and substantially radially of the chuck, and means for producing relative rotation of the chuck and the bead shifting mechanism whereby to effect a circumferential seating of tire beads on a sealing ring.

13. In an apparatus for mounting tires on sealing rings, a chuck adapted to support sealing and wedge rings, means sustained by the chuck for expanding the beads of a tire, bead shifting mechanism including pairs of rollers and universally movable supports therefor permitting the rollers to accommodate themselves to the wedge rings, and means for producing relative rotation of the chuck and the bead shifting mechanism whereby to effect a circumferential seating of tire beads on a sealing ring.

14. In an apparatus for mounting tires on sealing rings, a chuck, a shaft for supporting said chuck, connections for actuating said shaft, and means for shifting said shaft axially independently of its driving connections to facilitate the initial placing of sealing rings and tires thereon, said last named means including a fluid pressure actuatable plunger adapted to be operatively aligned with said shaft to shift it endwise.

15. In an apparatus for mounting tires on sealing rings, in combination, a chuck for supporting a sealing ring and bead expanding rings on opposite sides of the sealing ring, bead shifting rollers, and means for producing relative rotary movement and relative sidewise movement between the bead shifting rollers and the chuck.

16. In an apparatus for mounting tires on sealing rings, in combination, a chuck for supporting a sealing ring and bead expanding rings on opposite sides of the sealing ring, bead shifting mechanism, and means for producing relative rotary movement and relative sidewise movement between the bead shifting mechanism and the chuck, said bead shifting mechanism including opposed sets of rollers operable on opposite sides of a tire.

17. In apparatus for mounting tires on sealing rings, in combination, a chuck for supporting a sealing ring and bead expanding devices contiguous thereto, bead shifting mechanism, and means for producing relative rotary movement and relative sidewise movement between the bead shifting mechanism and the chuck, said bead shifting mechanism including opposed sets of rollers adapted to operate simultaneously on both beads of a tire, and yieldable supports for said rollers adapted to permit automatic movement thereof outward as they traverse the bead expanding devices.

18. In apparatus for mounting tires on sealing rings, in combination, a chuck for supporting a sealing ring and bead expanding rings on opposite sides of the sealing ring, bead shifting mechanism, and means for producing relative rotary movement and relative sidewise movement between the bead shifting mechanism and the chuck, said bead expanding mechanism including opposed sets of rollers arranged in pairs, and self shiftable supports for said pairs of rollers permitting them to accommodate themselves both circumferentially and radially to the inclined surfaces of the bead expanding rings as the bead mounting operation progresses.

19. In apparatus for mounting tires on sealing rings, in combination, upper and lower sets of bead shifting rollers, means for moving the upper set of rollers towards the lower set, a chuck adapted to hold tire sealing and wedge rings, the latter flanking the former, and to support a tire with its beads loosely positioned on the wedge rings, and means for rotating said chuck including an axially movable shaft permitting the chuck to shift and equalize the action of the upper and lower sets of bead rollers.

20. In apparatus for mounting tires on sealing rings, a chuck having a plurality of jaws, threaded stems supporting said jaws, means for preventing rotation of each jaw about the axis of its stem, sleeves having internal and external threads the former of which engage the threaded stems, means supporting said sleeves externally, and means for rotating the sleeves to move their stems endwise whereby the position of the jaws of the chuck may be positioned to accommodate sealing rings of different sizes.

21. In a machine for mounting tires on sealing rings, in combination, a movable frame, chucks supported at intervals by said frame, a set of lower bead shifting rollers supported by said frame below and in cooperative relation with each chuck, an upper set of bead shifting rollers supported above the plane of movement of the chucks, means for latching the frame against movement with any one of the chucks and lower set of bead shifting rollers in cooperative aligned relation with the upper set of bead shifting rollers, and means for rotating a chuck while located in such cooperative aligned relation.

Signed at Detroit, county of Wayne, State of Michigan, this 26th day of January, 1921.

ROBERT BRUSHWILER.
ALBERT OTTO.